(12) United States Patent
Murata

(10) Patent No.: US 6,619,845 B2
(45) Date of Patent: Sep. 16, 2003

(54) ROLLER RETAINER, DIRECT-ACTING GUIDE DEVICE AND ROLLER SCREW USING THE ROLLER RETAINER

(75) Inventor: Tomozumi Murata, Tokyo (JP)

(73) Assignee: THK Co., Ltd., Tokyo (JP)

( * ) Notice: Subject to any disclaimer, the term of this patent is extended or adjusted under 35 U.S.C. 154(b) by 61 days.

(21) Appl. No.: 09/809,285

(22) Filed: Mar. 16, 2001

(65) Prior Publication Data
US 2001/0038724 A1 Nov. 8, 2001

(30) Foreign Application Priority Data
Mar. 21, 2000 (JP) ...................... P.2000-083253

(51) Int. Cl.$^7$ .............................................. F16C 29/06
(52) U.S. Cl. .......................................... 384/44; 384/51
(58) Field of Search ....................................... 384/44, 51

(56) References Cited

U.S. PATENT DOCUMENTS

| | | | | | |
|---|---|---|---|---|---|
| 3,938,866 A | * | 2/1976 | Martin | ...................... | 384/623 |
| 3,966,284 A | * | 6/1976 | Martin | ...................... | 384/623 |
| 4,547,023 A | * | 10/1985 | Blatter | ...................... | 384/44 |
| 4,583,793 A | * | 4/1986 | Blatter | ...................... | 384/44 |
| 4,687,345 A | * | 8/1987 | Geka | ...................... | 384/44 |
| 4,743,124 A | * | 5/1988 | Blaurock | ...................... | 384/45 |
| 4,921,360 A | * | 5/1990 | Rottermann | ...................... | 384/44 |
| 6,247,846 B1 | * | 6/2001 | Shirai | ...................... | 384/45 |
| 6,352,367 B1 | * | 3/2002 | Konomoto et al. | ...................... | 384/45 |
| 6,390,678 B1 | * | 5/2002 | Shirai | ...................... | 384/44 |
| 6,419,069 B1 | * | 7/2002 | Teramachi | ...................... | 193/35 R |

FOREIGN PATENT DOCUMENTS

| | | |
|---|---|---|
| JP | 60-205013 A | 10/1985 |
| JP | 11-223258 A | 8/1999 |

* cited by examiner

*Primary Examiner*—Jack Lavinder
*Assistant Examiner*—Bradley T King
(74) *Attorney, Agent, or Firm*—Morgan, Lewis & Bockius LLP

(57) ABSTRACT

In a roller retainer assembly, a roller retainer 15 is thinned to retain individual one of plural rollers 7 circulating in a roller circulation path inclusive of linear and curved races and to hold opposite side surfaces of the roller 7 and front and rear surfaces thereof in the roller moving direction. A combination of linear and curve guide portions 16*a* and 16*b* different in inclination angle and a combination of linear and curve guide portion 17*a* and 17*b* different in inclination angle are formed respectively in opposite end surfaces of the roller retainer 15 in a retainer moving direction. In a linear race, the linear guide portions 16*a* and 17*a* come into contact with adjacent roller retainers 15 respectively. In a curved race, the curve guide portions 16*b* and 17*b* come into contact with adjacent roller retainers 15 respectively.

7 Claims, 10 Drawing Sheets

SECTION A-A

US 6,619,845 B2

ROLLER RETAINER, DIRECT-ACTING GUIDE DEVICE AND ROLLER SCREW USING THE ROLLER RETAINER

BACKGROUND OF THE INVENTION

1. Field of the Invention

The present invention relates to a roller retainer which is used in a direct-acting guide device, a roller screw, or the like, and in which a roller rolling in a circulation path is held so as to be rotatable/slidable.

2. Description of the Related Art

A roller screw having rollers interposed between a screw shaft and a nut member is known. When the screw shaft is rotated relative to the nut member, the nut member makes reciprocating motion in a direction of the axis of the screw shaft. The rollers make rolling motion so as to go around the outer circumference of a screw groove between the screw shaft and the nut member. Thus, the rollers circulate in a roller circulation path. A helical roller rolling groove is formed in the screw shaft. The roller circulation path containing a helical load rolling groove corresponding to the roller rolling groove is formed in the nut member. In the roller screw, the plurality of rollers maybe arranged in the roller circulation path so as to be parallel to one another to keep the axes of adjacent rollers approximately parallel to each other, or the plurality of rollers may be arranged in the roller circulation path so as to cross one another to intersect the axes of adjacent rollers.

Generally, in the case of a full-roller type roller screw in which only rollers are arranged in the roller circulation path, the respective rollers make no consistent motion so that each of the rollers falls down in a plane containing the axis of the roller and the direction of the movement of the roller to cause skew. Hence, the rollers are prevented from circulating while arranged in the roller circulation path. Though not relating to the roller screw, a belt-like ball retainer for rotatably/slidably holding a plurality of balls of a ball screw to make arranged circulation of the balls is known (for example, see JP-A-11-223258). The ball retainer holds the balls in the form of a linear chain so that front-side and rear-side adjacent balls can circulate smoothly.

On the other hand, a cage for holding corresponding one of rollers arranged and received in a circulation path of a direct-acting guide device is known (see JP-A-60-205013). FIG. 17 shows such cages circulating in the roller circulation path of the direct-acting guide device. A plurality of rollers 1 are cross-arranged in the roller circulation path 2 so that the axes of adjacent rollers 1 cross each other. The direction of the rollers 1 is changed two-dimensionally in between a linear load passage 2a and a U-shaped changing-direction passage 2b. FIG. 18 is a front view of a cage 3 with a roller 1 when viewed in the direction of the movement thereof. FIG. 19 is a sectional view taken along the line A—A in FIG. 18. Because of the cross arrangement of the rollers 1, the roller circulation path 2 is shaped substantially like a square in section. The cages 3 rotatably/slidably hold the rollers 1 in container holes 3a of the cages 3 individually and correspondingly while the outer circumferences 1a of the rollers 1 are exposed partially slightly. The thickness of the cage 3 (the radial thickness of the roller) is set to be approximately equal to that of the roller 1. As shown in the drawings, the shape of the cage 3 viewed from the front side in the direction of the movement forms a square approximately equal to the sectional shape of the roller circulation path 2 so that the roller 1 can be guided by the cage 3. As shown in FIG. 17, two end surfaces 3a and 3b which form an angle of not smaller than 90° are formed at two ends of the adjacent cages 3 in the direction of the movement thereof. When the cage 3 is located on the linear load passage 2a, one end surface 3a is positioned so as to be approximately perpendicular to the load passage 2a. When the cage 3 is located on the U-shaped changing-direction passage 2b, the other end surface 3b is directed to the direction of the radius of the changing-direction passage 2b. Thus, the cages 3 with the rollers 1 circulate in the roller circulation path 2 while the end surfaces 3a and 3b of adjacent cages 3 press each other.

In the background-art ball retainer holding balls in the form of a straight chain, however, the circulation path of the ball screw draws a spiral. Hence, the ball retainer is twisted so spirally that load is applied on the ball retainer. There is a risk that the ball retainer may be broken by the load.

On the other hand, the cages 3 by which the rollers 1 arranged and received in the roller circulation path 2 of the direct-acting guide device are held individually are adapted to the case where the linear load passage and the U-shaped changing-direction passage are positioned on one plane so that the direction of the rollers 1 is changed two-dimensionally. For example, in a circulation path of a roller screw, however, not two-dimensional direction changing but three-dimensional direction changing and, accordingly, twisting motion around the direction of the movement, may be required. In the aforementioned cages 3, the circulating cages 3 are not allowed to rotate slightly around the axes of the rollers 1 respectively so that the cages 3 can hardly make such complex motion. This is because the shape of each cage 3 is formed to be approximately equal to the sectional shape of the roller circulation path 2 and because adjacent cages 3 are in surface contact with each other at large-area flat end surfaces 3a and 3b. Moreover, a lubricant can hardly enter in between the cage 3 and a corresponding roller 1 because the circumference of the roller 1 except part of the outer circumference 1a is covered with the cage 3. Hence, the roller 1 cannot be lubricated sufficiently. Moreover, the approximately whole section of the roller circulation path 2 is covered with the cage 3. There is a problem that a support member for supporting the cage 3 to prevent the cage 3 from dropping down from the slide member when the slide member is removed from the race rail is hardly provided in the circulation path.

SUMMARY OF THE INVENTION

An object of the present invention has been made to solve the above object, and therefore an object of the invention is to provide a roller retainer which can circulate smoothly even in a complex kinetic condition such as a three-dimensional changing-direction passage and in which lubricating oil can be supplied sufficiently to rollers, and to provide a direct-acting guide device and a roller screw using such roller retainers.

The present invention will be described below. Although the reference numerals in the accompanying drawings are put in parentheses to make understanding of the present invention easy, the present invention is not limited to the embodiments based on the accompanying drawings.

To solve the problem, the inventor of the present invention provides a system in which rollers circulating in a circulating path are not held in the form of a straight chain but are held in roller retainers individually so that the rollers circulate in a circulation path while the rear-side roller retainer presses the front-side roller retainer. Further, because linear portions and curved portions mainly exit in the circulation path, the inventor considers the shape of each end of the roller retainer in a direction of the movement thereof so that pressing force is transmitted smoothly either in the linear portions or in the curved portions. Further, the inventor provides a system in which roller retainers can circulate while allowed to rotate slightly around the axes of the rollers respectively when the roller retainers circulate while pressing each other. Accordingly, the roller retainers can be adapted to a three-dimensionally complex circulation path on the assumption that the rollers are arranged in the circulation path and the axes of adjacent rollers are substantially kept parallel to each other.

Specifically, according to a first aspect of the present invention, there is provided a roller retainer assembly having roller retainers (15) for individually and correspondingly retaining a plurality of rollers (7) circulating in a roller circulation path inclusive of linear and curved races, wherein: each of the roller retainers (15) is made thin to hold opposite side surfaces of the roller (7) and front and rear surfaces of the roller (7) in a direction of movement of the roller (7); a linear guide portion (16a, 17a) and a curve guide portion (16b, 17b) which are different in inclination angle from each other are formed in opposite end surfaces of the roller retainer (15) in a direction of movement of the roller retainer (15); and the linear guide portion (16a, 17a) of the roller retainer (15) comes into contact with an adjacent roller retainer (15) in the linear race and the curve guide portion (16b, 17b) of the roller retainer (15) comes into contact with an adjacent roller retainer (15) in the curved race. By the provision of the roller retainer assembly, the above-mentioned problem is therefore solved. The thickness of the roller retainer (15) is selected to be not larger than 90%, preferably not larger than 60% of the roller diameter.

According to this invention, in either of linear races and curved races constituting a circulation race, adjacent roller retainers can press each other without spoiling the posture of a roller located in the front side in the direction of the movement of the roller. Hence, rollers can be aligned so that smooth circulation can be obtained. Further, because the roller retainer is made thin, the following effects are obtained.

(1) Adjacent roller retainers can press each other while they are allowed to rotate slightly around the axes of corresponding rollers respectively. As a result, the roller retainer can be obtained as a roller retainer adapted to a complex circulation path such as a three-dimensional changing-direction passage or a helical load rolling passage shaped like a screw.

(2) A large space can be secured for reserving lubricating oil in the circulation path. Hence, the rollers can be lubricated sufficiently.

(3) A drop-down prevention member for supporting the roller retainer can be provided in the circulation path so that the roller retainer is prevented from dropping down from the nut member, or the like.

According to a second aspect of the invention, there is provided a roller retainer assembly having roller retainers (31) for individually and correspondingly retaining a plurality of rollers (7) circulating in a roller circulation path inclusive of linear and curved races, wherein: each of the roller retainers (31) is made thin to hold the opposite side surfaces of the roller (7) and either one of front and rear surfaces of the roller (7) in a direction of movement of the roller (7); a linear guide portion (32a) and a curve guide portion (32b) which are different in inclination angle are formed in one end surface of the roller retainer (31) in a direction of movement of the roller retainer (31); and the linear guide portion (32a) of the roller retainer (31) comes into contact with an adjacent roller (7) in the linear race and the curve guide portion (32b) of the roller retainer (31) comes into contact with an adjacent roller (7) in the curved race. By the provision of the roller retainer assembly, the above-mentioned problem is therefore solved.

According to this invention, in addition to the same operation and effect as those of the aforementioned invention, the roller retainer holds either of front and rear surfaces of a corresponding roller in the direction of the movement of the roller. Hence, the space occupied by one roller retainer in the circulation path is reduced so that the number of rollers can be increased. Hence, the load capacity of a direct-acting guide device or roller screw using such roller retainers can be increased.

According to a third aspect of the invention, in the first aspect of the invention, each of the linear guide portion (16a, 17a) and the curve guide portion (16b, 17b) of the roller retainer (15) is formed to be a curved surface shaped like a circular arc in section so as to come into linear contact with the adjacent roller retainer (15).

According to this invention, adjacent roller retainers can press each other while they are securely allowed to rotate slightly around the axes of corresponding rollers respectively.

According to a fourth aspect of the invention, in the second aspect of the invention, each of the linear guide portion (32a) and the curve guide portion (32b) of the roller retainer (31) is formed to be a curved surface in accordance with an outer circumference of the roller (7).

According to this invention, a roller and a roller retainer which are adjacent to each other can press each other while the roller retainer is securely allowed to rotate slightly around the axis of a corresponding roller. Moreover, because the roller retainer comes into surface contact with a roller located in the front side or rear side in the direction of the movement of the roller retainer, contact surface pressure can be reduced.

According to a fifth aspect of the invention, in the roller retainer assembly as stated in the first or third aspect, a hinge protrusion (26) is provided at a point of intersection between the linear guide portion (16a) and the curve guide portion (16b) in one end surface of the roller retainer (25); and a hinge recess (27) is provided at a point of intersection between the linear guide portion (17a) and the curve guide portion (17b) in the other end surface of the roller retainer (25) so that the hinge recess (27) engages with the hinge protrusion (27) of an adjacent roller retainer.

According to this invention, the roller retainer is only allowed to swing around a hinge constituted by a combination of the hinge protrusion and the hinge recess in a plane containing the axis of a corresponding roller and the direction of the movement of the roller. Hence, the roller can be prevented from falling down even in a boundary shifting from a linear race to a curved race. Hence, smooth circulation of the roller can be ensured.

According to a sixth aspect of the invention, in any one of the first to fifth aspects, drop-down prevention protrusions (20) are formed on either one of the roller retainer (15) and the opposite side surfaces of the roller (7); and drop-down prevention recesses (21) are formed in the other one of the roller retainer and the opposite side surfaces of the roller so that the drop-down prevention protrusions are fitted into the drop-down prevention recesses.

According to this invention, the roller can be prevented from dropping out from the roller retainer. For example, even in the case where a slide member such as a nut member is removed from the race rail, the roller retainer can prevent the roller from dropping down from the slide member so that the roller can be prevented from dropping down from the slide member.

According to a seventh aspect of the invention, in any one of first to sixth aspects, a thickness of the roller retainer (15) is selected to be not smaller than 50% of a diameter of the roller. When a tapered roller is used as each of the rollers, the terminology "roller diameter" used herein means the smallest roller diameter.

If the thickness of each of the roller retainers is smaller than 50% of the roller diameter, the front end of the succeeding roller retainer in the circulation path enters the gap between the front-side roller retainer and the roller rolling groove so that adjacent roller retainers overlap each other. As a result, there is a risk that the circulation of rollers may stop. When the thickness of each of the roller retainers is not smaller than 50% of the roller diameter, such adjacent roller retainers can be prevented from overlapping each other.

Further, according to the invention, there is also provided a direct-acting guide device comprising: a race shaft (41, 51) containing a roller rolling surface (41a, 51a); a slide member (42, 52) including a roller circulation path containing a load rolling surface (42a, 52a) corresponding to the roller rolling surface (41a, 51a), the slide member (42, 52) being fitted to the race shaft (41, 51) so as to be freely movable relative to the race shaft (41, 51); a plurality of rollers (43, 53) arranged and received in the roller circulation path so as to circulate in accordance with movement of the slide member (42, 52) relative to the race shaft (41, 51); and a plurality of roller retainers (15) for holding the plurality of rollers (43, 53) individually and correspondingly so that the plurality of rollers (43, 53) are rotatable/slidable, wherein: the plurality of rollers (43, 53) are arranged and received so that the axes of adjacent rollers (43, 53) are kept approximately parallel to each other; each of the roller retainers (15) is made thin to hold opposite side surfaces of corresponding one of the rollers (7) and front and rear surfaces of the roller (7) in a direction of movement of the roller (7); a linear guide portion (16a, 17a) and a curve guide portion (16b, 17b) which are different in inclination angle from each other are formed in each of opposite end surfaces of the roller retainer (15) in a direction of movement of the roller retainer (15); and the linear guide portion (16a, 17a) of the roller retainer (15) comes into contact with an adjacent roller retainer (15) in a linear race and the curve guide portion (16b, 17b) of the roller retainer (15) comes into contact with an adjacent roller retainer (15) in a curved race.

Further, according to the invention, there is also provided a direct-acting guide device comprising: a race shaft (41, 51) containing a roller rolling surface (41a, 51a); a slide member (42, 52) including a roller circulation path containing a load rolling surface (42a, 52a) corresponding to the roller rolling surface (41a, 51a), the slide member (42, 52) being fitted to the race shaft (41, 51) so as to be freely movable relative to the race shaft (41, 51); a plurality of rollers (43, 53) arranged and received in the roller circulation path so as to circulate in accordance with movement of the slide member (42, 52) relative to the race shaft (41, 51); and a plurality of roller retainers (15) for holding the plurality of rollers (43, 53) individually and correspondingly so that the plurality of rollers (43, 53) are rotatable/slidable, wherein: the plurality of rollers (43, 53) are arranged and received so that the axes of adjacent rollers (43, 53) are kept approximately parallel to each other; each of the roller retainers (31) is made thin to hold opposite side surfaces of corresponding one of the rollers (7) and either one of front and rear surfaces of the roller (7) in a direction of movement of the roller (7); a linear guide portion (32a) and a curve guide portion (32b) which are different in inclination angle are formed in one end surface of the roller retainer (31) in a direction of movement of the roller retainer (31); and the linear guide portion (32a) of the roller retainer (31) comes into contact with an adjacent roller (7) in a linear race and the curve guide portion (32b) of the roller retainer (31) comes into contact with an adjacent roller (7) in a curved race.

Further, according to the invention, there is also provided a roller screw comprising: a race shaft (5) containing a helical roller rolling surface (5a); a slide member (6) including a roller circulation path (8) containing a helical load rolling surface (6a) corresponding to the roller rolling surface (5a), the slide member (6) being fitted to the race shaft (5) so as to be freely movable relative to the race shaft (5); a plurality of rollers (7) arranged and received in the roller circulation path (8) so as to circulate in accordance with movement of the slide member (6) relative to the race shaft (5); and a plurality of roller retainers (15) for holding the plurality of rollers (7) individually and correspondingly so that the plurality of rollers (7) are rotatable/slidable, wherein: the plurality of rollers (7) are arranged and received so that axes of adjacent rollers (7) are kept approximately parallel to each other; each of the roller retainers (15) is made thin to hold opposite side surfaces of corresponding one of the rollers (7) and front and rear surfaces of the roller (7) in a direction of movement of the roller (7); a linear guide portion (16a, 17a) and a curve guide portion (16b, 17b) which are different in inclination angle from each other are formed in each of opposite end surfaces of the roller retainer (15) in a direction of movement of the roller retainer (15); and the linear guide portion (16a, 17a) of the roller retainer (15) comes into contact with an adjacent roller retainer (15) in a linear race and the curve guide portion (16b, 17b) of the roller retainer (15) comes into contact with an adjacent roller retainer (15) in a curved race.

Further, according to the invention, there is also provided a roller screw comprising: a race shaft (5) containing a helical roller rolling surface (5a); a slide member (6) including a roller circulation path (8) containing a helical load rolling surface (6a) corresponding to the roller rolling surface (5a), the slide member (6) being fitted to the race shaft (5) so as to be freely movable relative to the race shaft (5); a plurality of rollers (7) arranged and received in the roller circulation path (8) so as to circulate in accordance with movement of the slide member (6) relative to the race shaft (5); and a plurality of roller retainers (15) for holding the plurality of rollers (7) individually and correspondingly so that the plurality of rollers (7) are rotatable/slidable, wherein: the plurality of rollers (7) are arranged and received so that axes of adjacent rollers (7) are kept approximately parallel to each other; each of the roller retainers (31) is made thin to hold opposite side surfaces of corresponding one of the rollers (7) and either one of front and rear surfaces of the roller (7) in a direction of movement of the roller (7); a linear guide portion (32a) and a curve guide portion (32b) which are different in inclination angle are formed in one end surface of the roller retainer (31) in a direction of movement of the roller retainer (31); and the linear guide portion (32a) of the roller retainer (31) comes into contact with an adjacent roller (7) in a linear race and the curve guide portion (32b) of the roller retainer (31) comes into contact with an adjacent roller (7) in a curved race.

DETAILED DESCRIPTION OF THE PREFERRED EMBODIMENTS

Now, a description will be given in more detail of preferred embodiments of the invention with reference to the accompanying drawings.

Figure 1:
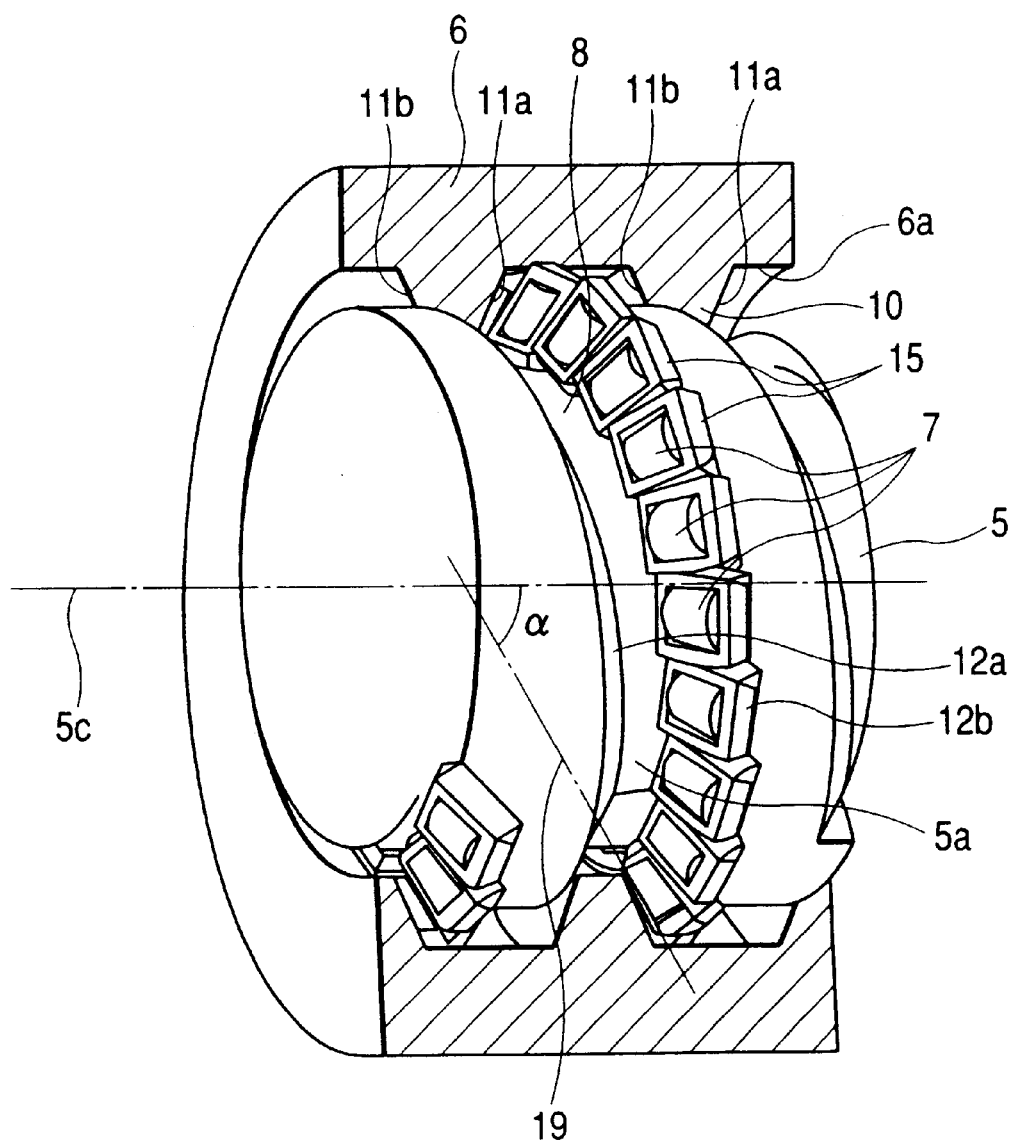
FIG. 1 is a perspective view showing a roller screw in which roller retainers according to a first embodiment of the present invention are incorporated.

FIG. 1 shows a roller screw in which roller retainers according to a first embodiment of the present invention are incorporated. The roller screw comprises a screw shaft 5 (race shaft), a nut member 6 (slide member), and a plurality of rollers 7. The screw shaft 5 has a helical roller rolling groove 5a in its outer circumferential surface so that the helical roller rolling groove 5a serves as a roller rolling surface. The nut member 6 has a roller circulation path formed in its inner cirumferential surface. The roller circulation path includes a helical load rolling groove 6a so that the helical load rolling groove 6a serves as a load rolling surface corresponding to the roller rolling groove 5a. The nut member 6 is fitted to the screw shaft 5 so as to be relatively movable. The plurality of rollers 7 are arranged and received in the roller circulation path and circulate in accordance with the relative movement of the nut member 6 to the screw shaft 5. The plurality of rollers 7 are arranged and received in the roller circulation path so that axes of adjacent rollers 7 are kept substantially parallel to each other. In the roller circulation path, a load rolling passage 8 is formed between the roller rolling groove 5a of the screw shaft 5 and the load rolling groove 6a of the nut member 6. The nut member 6 has a return pipe. The return pipe forms a no-load return passage by which one end of the load rolling passage 8 communicates with the other end of the load rolling passage 8.

Figure 2:
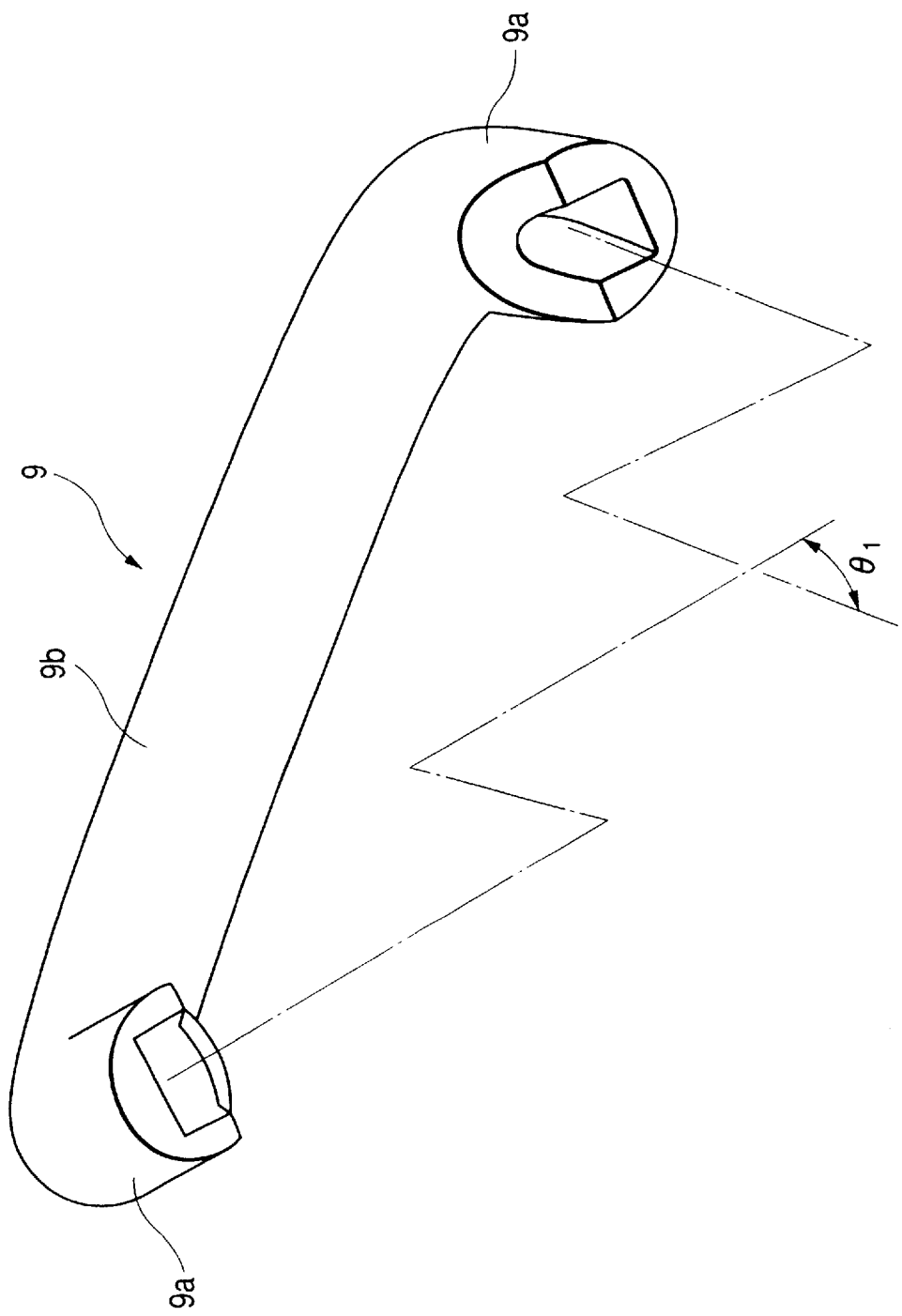
FIG. 2 is a perspective view showing a return pipe which is incorporated in the roller screw.

FIG. 2 shows the return pipe 9. The return pipe 9 has a body portion 9b, and opposite end portions 9a bent with respect to the body portion 9b. The opposite end portions 9a are fitted into the load rolling passage so that a distance of several pitches is left between the opposite end portions 9a. Incidentally, the return pipe 9 is fixed to the nut member 6 by a pipe pressing.

Figure 3:
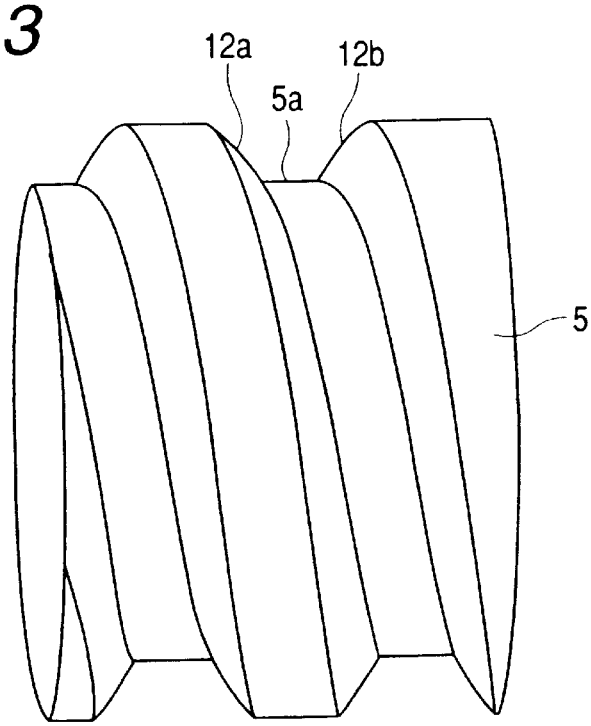
FIG. 3 is a perspective view showing a screw shaft in the roller screw.

FIG. 3 shows the screw shaft 5. The helical roller rolling groove 5a having a predetermined lead is formed in the outer circumferential surface of the screw shaft 5. The roller rolling groove 5a is shaped like a trapezoid in section. Each of the rollers 7 rolls on a wall surface 12a or 12b of the roller rolling groove 5a.

As shown in FIG. 1, the nut member 6 is substantially shaped like a cylinder. The helical load rolling groove 6a having a lead equal to the lead of the screw shaft 5 is formed in the inner circumferential surface of the nut member 6. The load rolling groove 6a is also shaped like a trapezoid in section. A protrusion 10 for forming the load rolling groove 6a of the nut member 6 is fitted into the roller rolling groove 5a so that the inner diameter of the nut member 6 is made smaller than the outer diameter of the screw shaft 5. Each of the rollers 7 rolls on a wall surface 11a or 11b of the load rolling groove 6a. The load rolling groove 6a of the nut member 6 may be shifted in the middle way. Hence, up to the shift position, a space for arranging the rollers 7 is formed between the wall surface 12b of the roller rolling groove 5a and the wall surface 11b of the load rolling groove 6a and, after the shift position, a space for arranging the rollers 7 is formed between the wall surface 12a of the roller rolling groove 5a and the wall surface 11a of the load rolling groove 6a. Return pipe fitting holes are formed in the nut member 6 so that the opposite sides of the return pipe 9 are inserted in the holes respectively. The return pipe fitting holes extend into the load rolling groove 6a.

As is obvious from FIG. 2, the return pipe 9 has opposite end portions 9a bent by about 90° with respect to the body portion 9b. That is, the return pipe 9 is substantially formed of a double housing type. A section of the no-load return passage of the return pipe 9 is determined in accordance with the shape of each roller 7. As shown in FIG. 2, the opposite end portions 9a are not parallel to each other so that the respective directions of the opposite end portions 9a make a torsional angle θ1 (which changes in accordance with the lead angle).

Figure 4:
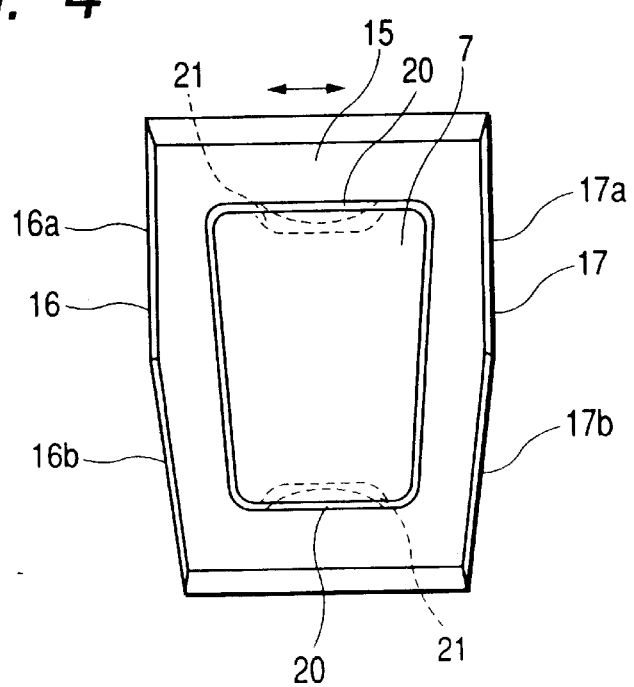
FIG. 4 is a front view showing a combination of a roller retainer and a roller in the first embodiment of the present invention.
Figure 5:
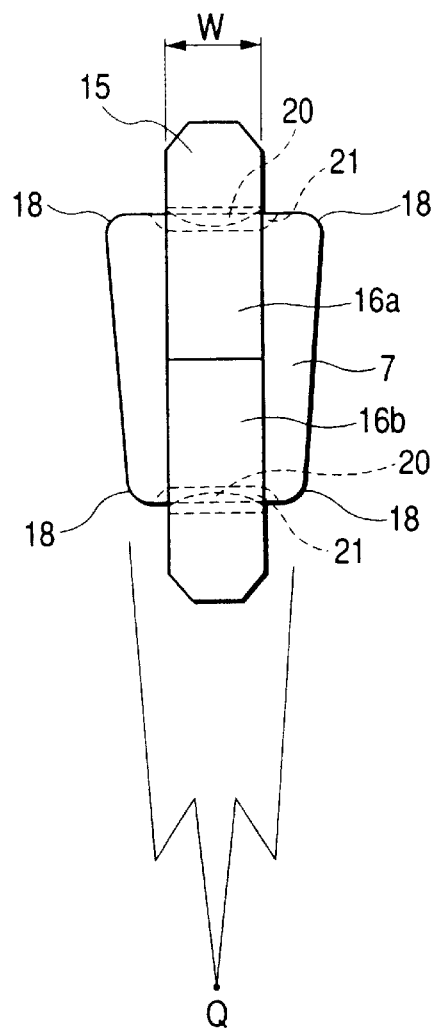
FIG. 5 is a side view showing a combination of a roller retainer and a roller in the first embodiment of the present invention.
Figure 6:
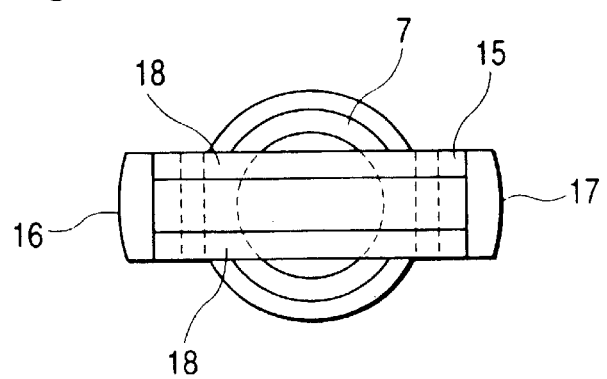
FIG. 6 is a bottom view showing a combination of a roller retainer and a roller in the first embodiment of the present invention.

FIGS. 4 to 6 show roller retainers 15 and rollers 7 which are incorporated in the roller screw. FIG. 4 is a view (front view) in a direction perpendicular to the direction of the axis of each roller 7 and perpendicular to the direction of the movement of each roller 7. FIG. 5 is a view (side view) from the direction of the movement of each roller 7. FIG. 6 is a view (bottom view) from the direction of the axis of each roller 7. Roller retainers 15 of the same number as that of the rollers 7 are provided to retain the rollers 7 individually. Each of the roller retainers 15 is made thin to hold front and rear surfaces of a corresponding roller 7 in the direction of the movement of the roller 7. The frontal shape of the roller retainer 15 (viewed from the direction perpendicular to the axis of the roller and perpendicular to the direction of the movement of the roller) is formed like a frame. The thickness W of each side surface of the roller retainer 15 is set to be in a range of from 50% to 90%, preferably in a range of from 50% to 60% of the diameter of the roller. Incidentally, when a tapered roller is used as the roller 7, the diameter of the roller is minimized.

A linear guide portion 16a and a curve guide portion 16b different in inclination angle from each other are formed in an end surface 16 of a roller retainer 15 in the direction of the movement of the roller retainer 15. A linear guide portion 17a and a curve guide portion 17b different in inclination angle from each other are formed in the other end surface 17 of the roller retainer 15 in the direction of the movement of the roller retainer 15. The linear guide portions 16a and 17a are formed so as to be substantially parallel to the axis of each roller 7. The curve guide portions 16b and 17b are formed so that the curve guide portions 16b and 17b face radial directions respectively when roller retainers are arranged in a curved race. That is, in a curved race, the curve guide portions 16b and 17b of the roller retainer 15 come into contact with adjacent roller retainers 15 and, in a linear race, the linear guide portions 16a and 17a of the roller retainer 15 come into contact with adjacent roller retainers 15. The linear guide portions 16a and 17a and the curve guide portions 16b and 17b of the roller retainer 15 are formed to be sectionally circular arc-shaped curved surfaces so as to come into linear contact with adjacent roller retainers 15 (see FIG. 6). As shown in FIG. 5, four corners of side surfaces of the roller retainer 15 are cut to be chamfered portions 18. Hence, the roller retainer 15 can be prevented from interfering with the screw shaft 5 even in the case where the axis 19 of the roller 7 is arranged not to be perpendicular to the center line 5c of the screw shaft 5 but to be inclined at an angle a as shown in FIG. 1. As shown in FIG. 4, a pair of drop-down prevention protrusions 20, 20 are formed on the upper and lower portions, on the roller 7 side, of the roller retainer 15. Further, a pair of recesses 21, 21 are formed on the side surface of the roller 7 so that the recesses 21 are fitted to the protrusions 20, 20. Hence, the roller retainer 15 holds the roller 7 so that the roller 7 can rotate around its axis 19. Incidentally, the drop-down prevention protrusions 20 may be provided on the roller 7 side while the drop-down prevention recesses 21 may be provided on the roller retainer 15 side. The roller retainer 15 is made from a synthetic resin or the like, as a raw material, by injection molding, or the like.

A tapered roller can be used as the roller 7. The apex Q of the cone of the tapered roller is located on the center line 5c of the screw shaft 5. Hence, the tapered roller rolls without slipping between the load rolling groove 6a and the roller rolling groove 5a. Incidentally, the sectional shape of the roller rolling groove 5a, the sectional shape of the load rolling groove 6a and the side shape of the roller can be set freely in accordance with load, accuracy, etc. required of the roller screw.

As shown in FIG. 1, when the screw shaft 5 is rotated, rollers 7 and roller retainers 15 rolling in the load rolling passage 8 in the direction of the circumference of the screw shaft 5 while suffering load are scooped by the return pipe 9. The scooped rollers 7 and roller retainers 15 pass through the return pipe 9. Then, the rollers 7 and roller retainers 15 are returned to the load rolling passage 8 after the distance of several pitches. When the direction of the rotation of the screw shaft 5 is inverted, the respective rollers 7 circulate in the reverse course. Incidentally, the nut member 6 may be rotated in the condition that the screw shaft 5 is provided as a stationary side. Also in this case, the rollers 7 can circulate in the aforementioned manner.

Figure 7:
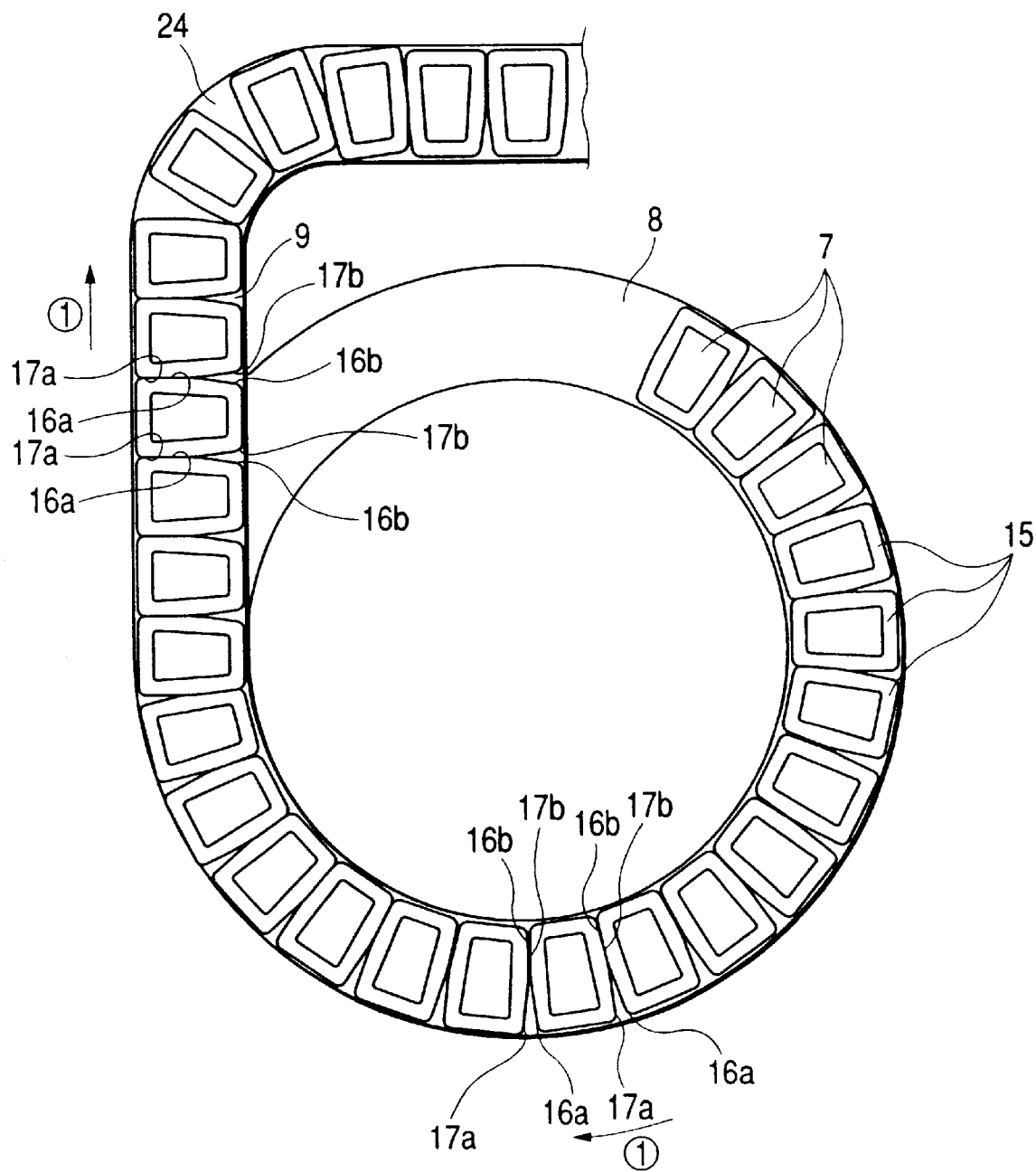
FIG. 7 is a view showing roller retainers and rollers which circulate in a roller screw circulation path.

FIG. 7 shows rollers 7 and roller retainers 15 circulating in the return pipe 9 and the load rolling passage 8. As shown in FIG. 7, in a linear race (in a return pipe 9) constituting a circulation path, a linear guide portion 16a of a roller retainer 15 located in the rear side in the direction (1) of the movement of the roller 7 presses a linear guide portion 17a of another roller retainer 15 located in the front side. In a curved race (in a load rolling passage 8), the curve guide portion 16b of the rear-side roller retainer 15 presses the curve guide portion 17b of the front-side roller retainer 15. Either in the linear race or in the curved race, the rear-side roller retainer 15 can press the front-side roller retainer 15 without spoiling the posture of the roller 7 located in the rear side in the direction of the movement of the rollers 7. When a tapered roller is used as each of the rollers 7, particularly in a linear race, the roller 7 tries to fall down in a plane containing the axis and the direction of the movement of the roller. In the linear race, linear guide portions 16a and 17a of adjacent roller retainers 15 come into close contact with each other, while, in the curved race, curve guide portions 16b and 17b of adjacent roller retainers 15 come into close contact with each other. As a result, the rollers 7 are aligned so that smooth circulation can be obtained. In most cases, the return pipe 9 in a no-load region has a linear race, a circular-arc race, a linear race, and a circular-arc race. When the curvature of a circular arc 24 of the return pipe 9 is made coincide with the curvature of the load rolling passage 8, rollers 7 can be aligned so that smooth circulation can be obtained. This is because the curve guide portions 16b and 17b of adjacent roller retainers 15 come into close contact with each other even in the circular arc portion of the return pipe 9. When the curvature of the circular arc 24 of the return pipe 9 does not coincide with the curvature of the load rolling passage 8, the curve guide portions 16b and 17b may be further separated into two portions different in inclination angle. That is, guide portions may be separated into three stages, for example, a linear guide portion, a curve guide portion for load rolling passage and a curve guide portion for return pipe, may be formed.

Figure 8:
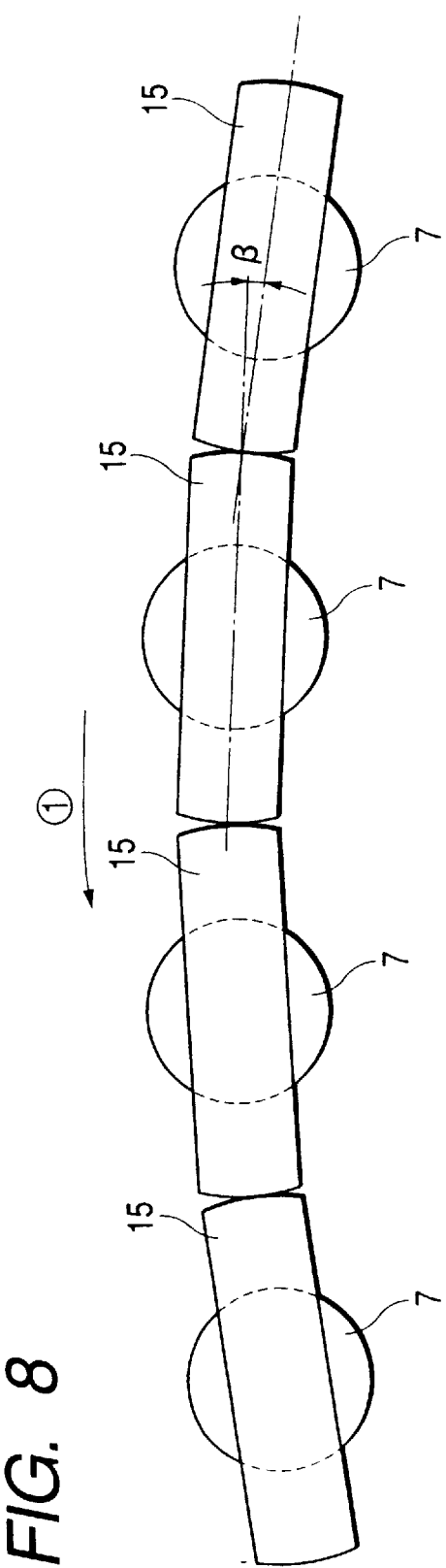
FIG. 8 is a view showing rollers and roller retainers which circulate in a helical load rolling passage.

As described above, the load rolling passage 8 of the roller screw is formed helically. As described above with reference to FIG. 2, the return pipe for changing the direction of the scooped roller 7 has a torsion (torsional angle θ1) around the direction of the movement of the roller. That is, in the roller screw, the rollers 7 and roller retainers 15 change their directions three-dimensionally and make complex motion. The aforementioned roller retainers 15 are adapted to such a complex motion. As shown in FIG. 5, the thickness W of each side of each roller retainer 15 is made small. Furthermore, the linear guide portions 16a and 17a (to be in close-contact) and curve guide portions 16b and 17b (to be in close-contact) of adjacent roller retainers 15 are shaped like circular arcs in section so as to come into linear contact with each other. Hence, such adjacent roller retainers 15 press each other while they are allowed to rotate slightly around the axes of corresponding rollers 7 respectively. As a result, the roller retainers 15 freely change their direction three-dimensionally with corresponding rollers 7 respectively, so that complex motion required of the roller screw in this embodiment can be made. Particularly when the axis 19 of each roller 7 is not perpendicular to the center line 5c of the screw shaft 5 but inclined at a predetermined angle as shown in FIG. 1, the roller 7 circulates in an umbrella-like curved race. Therefore, adjacent roller retainers 15 need to come into close contact with each other while a crossing angle β between the adjacent roller retainers 15 is kept constant as shown in FIG. 8. According to the present invention, adjacent roller retainers 15 press each other while they are allowed to rotate slightly around the axes of corresponding rollers 7 respectively. Accordingly, roller retainers 15 sufficiently adapted to such circulation form can be obtained.

Because each of the roller retainers 15 is made thin, a large space can be ensured for reserving lubricating oil in the circulation path. Hence, the rollers 7 can be lubricated sufficiently. Furthermore, because each of the roller retainers 15 is made thin, a large gap can be taken between the roller retainers 15 and the load rolling groove 6a. Hence, a support member for supporting the roller retainers 15 can be provided in the circulation path to prevent the roller retainers 15 from dropping down from the nut member 6, or the like.

Figure 9:
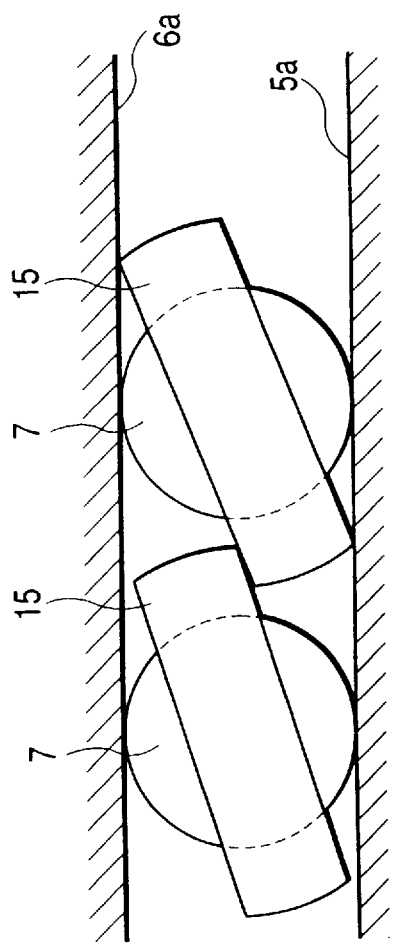
FIG. 9 is a view showing an example where adjacent roller retainers overlap each other.

FIG. 9 shows the case where the thickness of each roller retainer 15 is selected to be smaller than 50% of the roller diameter. If the thickness of the roller retainer 15 is made smaller than 50% of the roller diameter, the front end of the succeeding roller retainer 15 enters the gap between the front-side roller retainer 15 and the roller rolling groove 5a so that adjacent roller retainers 15 may overlap each other. As a result, there is a risk that the circulation of the rollers 7 may stop. When the thickness of the roller retainer 15 is selected to be not smaller than 50% of the roller diameter, adjacent roller retainers 15 can be prevented from overlapping each other as described above.

Figure 10:
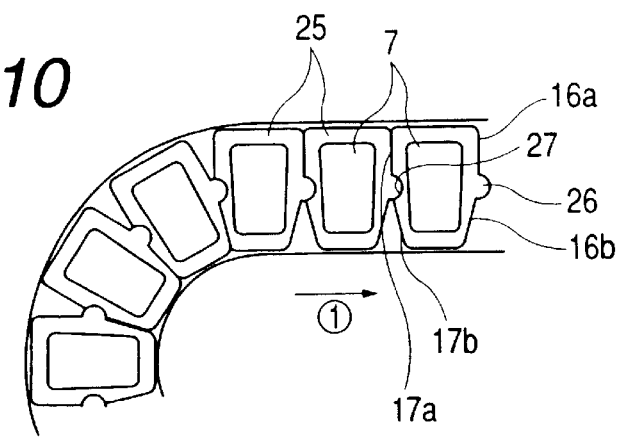
FIG. 10 is a view showing roller retainers arranged in a circulation path according to a second embodiment of the present invention.

FIG. 10 shows a second embodiment of the present invention concerning rollers and roller retainers incorporated in the roller screw. Each of the roller retainers 25 has substantially the same configuration as that of the roller retainer 15 according to the first embodiment. The roller retainer 25 further has a hinge protrusion 26, and a hinge recess 27 fitted to the hinge protrusion 26 of the adjacent roller retainer 25. The hinge protrusion 26 is provided at a point of intersection between the linear guide portion 16a and the curve guide portion 16b on one end surface of the roller retainer 25 in the direction of the movement of the roller 7. The hinge recess 27 is provided at a point of intersection between the linear guide portion 17a and the curve guide portion 17b on the other end surface of the roller retainer 25. Because the hinge protrusion 26 and the hinge recess 27 are provided in the aforementioned manner, the roller retainer 25 is only allowed to swing around a hinge constituted by a combination of the hinge protrusion 26 and the hinge recess 27 in a plane containing the axis of a corresponding roller 7 and the direction (1) of the movement of the roller 7. Hence, the roller 7 can be prevented from falling down even in the boundary in which the roller is moving from the linear race to the curved race. Hence, smooth circulation of the roller 7 can be ensured.

Figure 11:
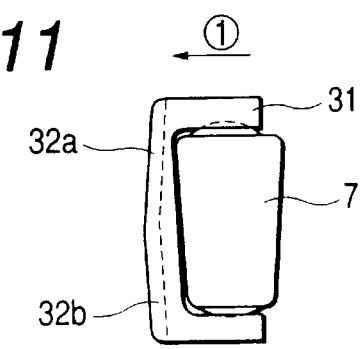
FIG. 11 is a front view showing a combination of a roller retainer and a roller in a third embodiment of the present invention.
Figure 12:
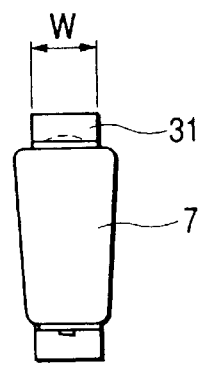
FIG. 12 is a side view showing a combination of a roller retainer and a roller in the third embodiment of the present invention.
Figure 13:
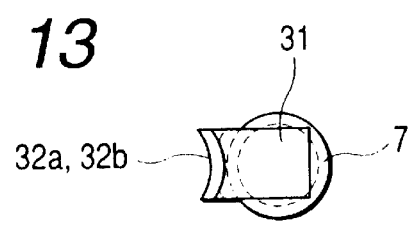
FIG. 13 is a bottom view showing a combination of a roller retainer and a roller in the third embodiment of the present invention.
Figure 14A:
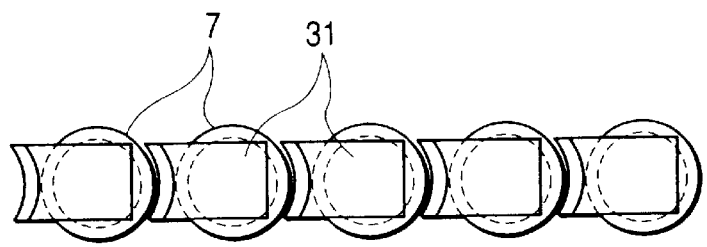
FIG. 14A is a plan view showing an example where roller retainers and rollers in the third embodiment of the present invention are aligned in a line.
Figure 14B:
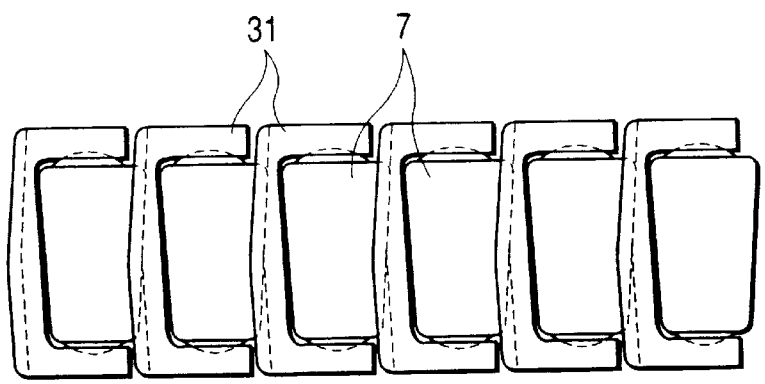
FIG. 14B is a side view showing an example where roller retainers and rollers in the third embodiment of the present invention are aligned in a line.
Figure 14C:
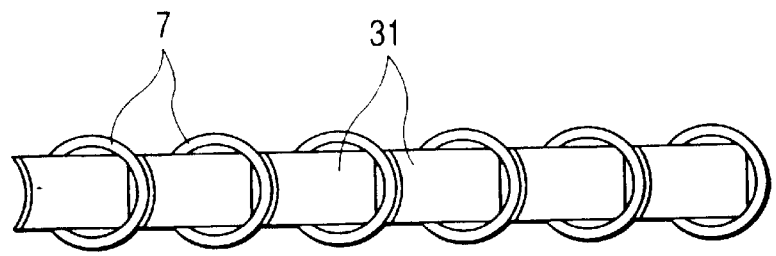
FIG. 14C is a bottom view showing an example where roller retainers and rollers in the third embodiment of the present invention are aligned in a line.

FIGS. 11 to 13 and FIGS. 14A to 14C show a third embodiment of the present invention concerning roller retainers incorporated in the roller screw. FIG. 11 is a view (front view) from a direction perpendicular to the axis of each roller 7 and perpendicular to the direction (1) of the movement of the roller 7. FIG. 12 is a view (side view) from the rear side in the direction of the movement of the roller 7. FIG. 13 is a view (bottom view) from the direction of the axis of the roller 7. FIGS. 14A to 14C are views showing the case where roller retainers with rollers 7 are aligned in a line. In this embodiment, each of the roller retainers 31 is made thin to hold only the opposite side surfaces of a corresponding roller 7 and the front surface of the same roller 7 in the direction of the movement of the roller 7. Each of the roller retainers 31 is shaped like a U figure in front view. The thickness W of each side of the roller retainer 31 is selected to be in a range of from 50% to 90%, preferably in a range of from 50% to 60% of the roller diameter.

A linear guide portion 32a and a curve guide portion 32b which are different in inclination angle from each other are formed in one end surface of the roller retainer 31 in the direction of the movement thereof. The linear guide portion 32a is inclined at a predetermined angle with respect to the axis of the roller 7 so that the axes of adjacent rollers 7 are kept parallel to each other. The curve guide portion 32b is inclined so that the roller retainers 31 face radial directions when the roller retainers 31 are arranged in a curved race. That is, in a curved race, the curve guide portion 32b comes into contact with an adjacent roller 7 and, in a linear race, the linear guide portion 32a comes into contact with the adjacent roller 7. The linear guide portion 32a and the curve guide portion 32b are formed as a curved surface corresponding to the outer circumference of the roller 7.

According to this roller retainer 31, the roller retainer 31 and a roller 7 adjacent to the roller retainer 31 can press each other while the roller retainer 31 is allowed to rotate slightly around the axis of a corresponding roller 7 in the same manner as that in the roller retainer 15 in the first embodiment. Hence, the roller retainer 31 can fulfil the same operation and effect as those of the roller retainer 15 obtained in the first embodiment. Furthermore, because the roller retainer 31 comes into surface contact with a roller 7 located in the front side or rear side in the direction of the movement of the roller, contact surface pressure can be also reduced.

In the example of this roller screw, rollers 7 rolling in the roller rolling groove 5a of the screw shaft 5 are scooped by the return pipe 9 and returned by several pitches. Alternatively, a deflector for scooping rollers 7 may be provided in the nut member 6. That is, one of rollers 7 rolling on the roller rolling groove 5a of the screw shaft 5 may be picked out from the roller rolling groove 5a by the deflector so that the roller 7 skips over the outer diameter portion of the screw shaft 5 and returns to the roller rolling groove 5a before one lead. Though not shown, a so-called side cover type roller screw may be used. That is, the nut member 6 is constituted by a nut body having a load rolling groove formed therein and side covers attached to opposite ends of the nut body. A roller return passage is formed in the nut body. A communication passage by which the load rolling groove and the return passage communicate with each other is formed in each of the side covers.

The roller retainer according to the present invention is not limited only to the roller screw, but can be applied to a direct-acting guide device such as a linear guide or a spline. Particularly the roller retainer according to the present invention can be adapted to a direct-acting guide device except the case where each roller circulates two-dimensionally in a plane perpendicular to the axis of the roller. That is, the roller retainer according to the present invention can be adapted to a direct-acting guide device having a circulation path which is so complex that the path is bent while the roller is twisted.

Figure 15:
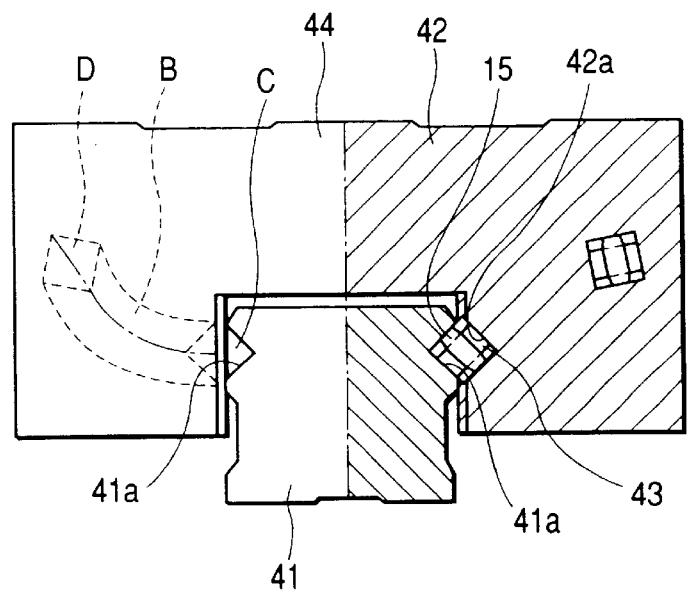
FIG. 15 is a view showing a linear guide in which roller retainers according to the first embodiment of the present invention are incorporated (partly including a section taken in a direction perpendicular to a guide rail)

FIG. 15 shows a linear guide in which roller retainers 15 according to the first embodiment of the present invention are incorporated. The linear guide is a well known device for guiding a movable body such as a table on a stationary portion such as a bed or a saddle. The linear guide has a guide rail 41 (race shaft), a moving block (slide member) 42, and a plurality of rollers 43. The guide rail 41 is disposed on the stationary portion and has a roller rolling groove 41a which is formed along the direction of the length thereof so that the roller rolling groove 41a serves as a roller rolling surface. The moving block 42 is fitted to the guide rail 41 so as to be relatively movable. A roller circulation path containing a load rolling groove 42a corresponding to the roller rolling grove 41a of the guide rail 41 is formed in the moving block 42 so that the load rolling groove 42a serves as a load rolling surface. The plurality of rollers 43 are arranged and received in the roller circulation path and circulate in the roller circulation path in accordance with the relative movement of the moving block 42 to the guide rail 41. The plurality of rollers 43 are held in the roller retainers 15 individually and correspondingly. The rollers 43 are arranged and received in the roller circulation path so that the axes of the rollers 43 are substantially kept parallel to one another. With the endless circulation of the rollers 43, the moving block 42 supporting the rollers makes linear motion along the guide rail 41.

The guide rail 41 is slenderly elongated to form a quadrilateral in section. A roller rolling groove 41a, which serves as a race when a roller 43 rolls, is formed in each of left and right side surfaces of the guide rail 41 so as to extend over the whole length of the guide rail. Although FIG. 15 shows the case where the race rail is linear, the invention may be applied also to the case where the rail is curved. Although FIG. 15 shows the case where two roller rolling grooves 41a are provided in left and right, the invention may be applied also to the case where the number of roller rolling grooves is changed variously in accordance with the purpose of use of the linear guide, or the like.

The moving block 42 is roughly constituted by a combination of a moving body 44 and a pair of side covers (not shown) disposed at opposite ends of the moving body 44. Two load rolling grooves 42a corresponding to the roller rolling grooves 41a are provided in the moving body 44. The combination of the load rolling grooves 42a and the roller rolling grooves 41a forms two load rolling passages C between the guide rail 41 and the moving block 42.

Two return passages D extending in parallel to the load rolling passages C respectively and changing-direction passages B for connecting the load rolling passages C to the return passages D respectively are further provided in the moving body 44. The combination of the load rolling passages C, the return passages D and the pair of changing-direction passages for connecting the load rolling passages C to the return passages D respectively forms one roller circulation path. Each of the changing-direction passages B has a three-dimensionally complex race.

As the moving block 42 moves along the guide rail 41, the roller 43 rolls in the load rolling passage C from one end to the other end while the roller 43 suffers load from the moving block 42. Then, each of the rollers 43 is scooped by one changing-direction passage B and led to the return passage D. The roller 43 is further returned to one end of the load rolling passage C through the opposite changing-direction passage B. On this occasion, in the load rolling passages C and return passages D constituting a linear race, the linear guide portion of the rear-side roller retainer 15 presses the linear guide portion of the front-side roller retainer 15. In the changing-direction passages B constituting a curved race, the curve guide portion of the rear-side roller retainer 15 presses the curve guide portion of the front-side roller retainer 15. Either in the linear race or in the curved race, the rear-side roller retainer 15 can press the front-side roller retainer 15 without spoiling the posture of the roller 7 located in the front side in the direction of the movement of the rollers.

As described above, each side surface of the roller retainer 15 is made thin, and the linear guide portion and curve guide portion for making adjacent roller retainers in close contact with each other are shaped like circular arcs in section so that they come into linear contact with adjacent roller retainers. Hence, adjacent roller retainers press each other while they are allowed to rotate slightly around the axes of corresponding rollers respectively. In such a manner, the roller retainers 15 with the rollers 43 can change their direction three-dimensionally freely. Hence, the roller retainers 15 can make such complex motion as that required of the changing-direction passages B of the linear guide in this embodiment.

Although this embodiment has shown the case where the relative movement of the moving block 42 to the guide rail 41 is made linearly, the present invention may be preferably applied also to a guide device which is configured so that the relative motion is curved.

Figure 16:
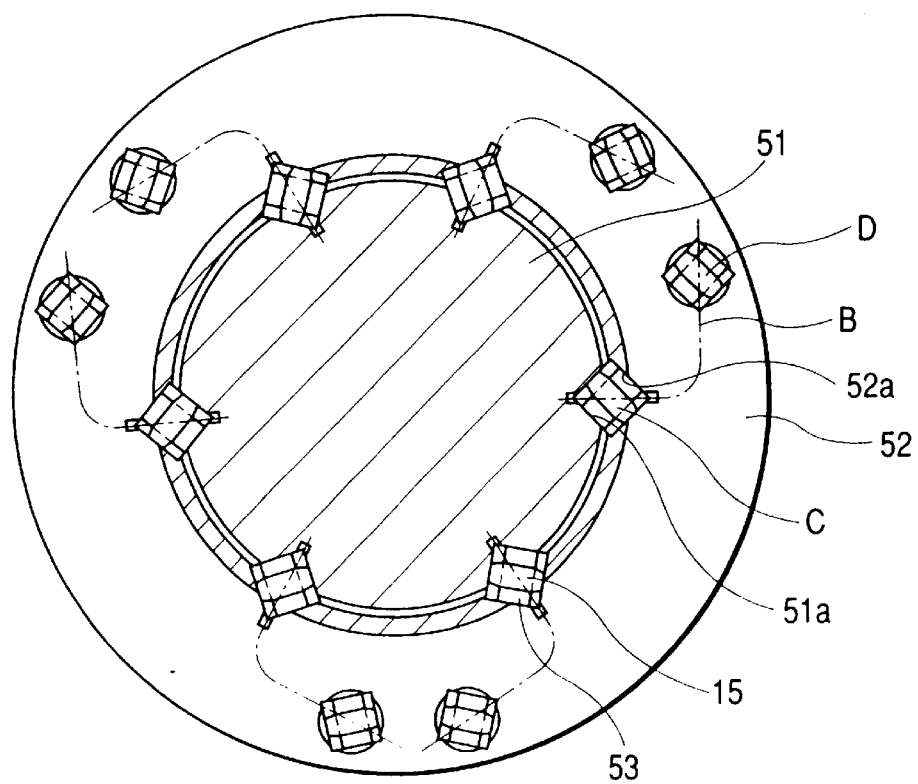
FIG. 16 is a view showing a spline in which roller retainers according to the first embodiment of the present invention are incorporated.
Figure 17:
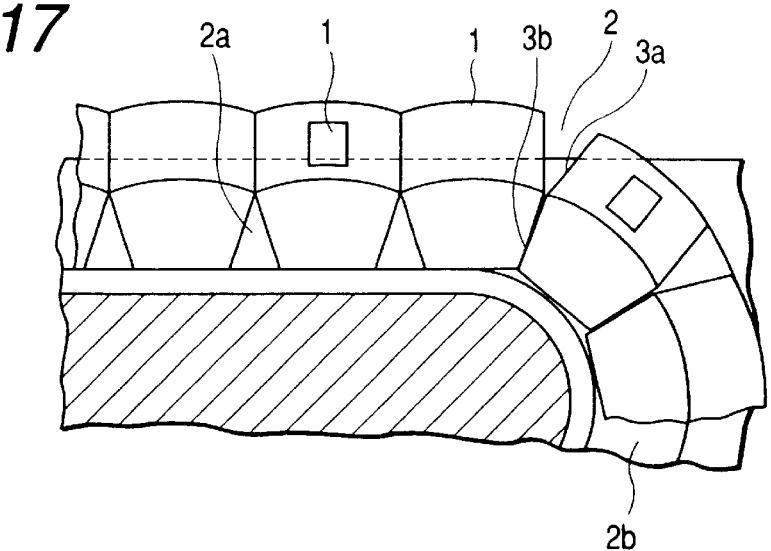
FIG. 17 is a view showing cages which circulate in a roller circulation path of a background-art direct-acting guide device.
Figure 18:
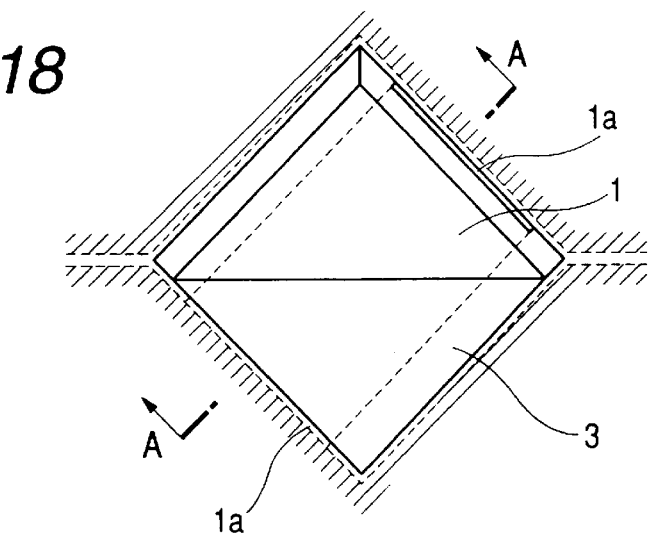
FIG. 18 is a view showing a background-art combination of a cage and a roller.
Figure 19:
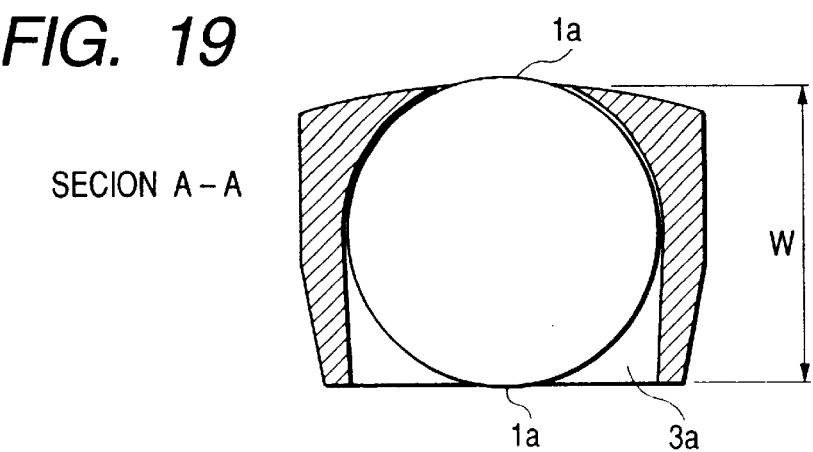
FIG. 19 is a sectional view taken along the line A—A in FIG. 18.

FIG. 16 shows a spline in which roller retainers according to the first embodiment of the present invention are incorporated. The spline has a spline shaft 51, and an outer cylinder 52. The spline shaft 51 serves as a race member whereas the outer cylinder 52 serves as a slide member. The outer cylinder 52 is mounted on the spline shaft 51 so as to be movable through a plurality of rollers 53. The plurality of rollers 53 are held in roller retainers 15, individually, obtained in the first embodiment. Further, the axes of adjacent rollers are substantially kept parallel to each other.

The spline shaft 51 is shaped like a column of a true circle. A plurality of roller rolling grooves 51a, which act as roller races and serve as roller rolling surfaces extending in the axial direction of the spline shaft 51, are formed in a surface of the spline shaft 51. For example, six roller rolling grooves 51a are formed.

The outer cylinder 52 mounted on the spline shaft 51 has load rolling grooves 52a corresponding to the roller rolling grooves 51a. The load rolling grooves 52a serve as load rolling surfaces. A plurality of rollers 53 are arranged in the roller circulation path so that the rollers 53 circulate in addition to the linear movement of the outer cylinder 52 relative to the spline shaft 51. A load rolling passage C is formed between each load rolling groove 52a formed in the outer cylinder 52 and a corresponding roller rolling groove 51a formed in the spline shaft 51. A no-load return passage D is formed adjacently to each load rolling passage C. In the no-load return passage D, rollers 53, which is released from load, roll. A changing-direction passage B for connecting each load rolling passage C to a corresponding no-load return passage D is further formed in the outer cylinder 52. The changing-direction passage B has a three-dimensionally complex race like that of the linear guide.

When the outer cylinder 52 is moved relatively to the spline shaft 51, the roller 53 rolls in the no-load rolling passage C while it suffers load. Hence the roller 53 changes its direction in the changing-direction passage B and moves to the no-load return passage D. In the no-load return passage D, the roller 53 moves in the reverse direction against the load rolling passage C. The rollers 53 moving in the no-load return passage D change its direction again in the other changing-direction passage B and return to the no-load return passage C again. On this occasion, in the load rolling passages C and no-load return passages D constituting linear races, the linear guide portion of the rear-side roller retainer 15 presses the linear guide portion of the front-side roller retainer 15. In the changing-direction passage B constituting curved race, the curve guide portion of the rear-side roller retainer 15 presses the curve guide portion of the front-side roller retainer 15. Either in the linear race or in the curved race, the rear-side roller retainer 15 can press the front-side roller retainer 15 without spoiling the posture of the roller 53 located in the front side in the direction of the movement of the roller.

Further, each side surface of the roller retainer 15 is made thin, and the linear guide portion and curve guide portion for making adjacent roller retainers 15 in close contact with each other are shaped like circular arcs in section so that they come into linear contact with adjacent roller retainers. Hence, adjacent roller retainers 15 press each other while they are allowed to rotate slightly around the axes of corresponding rollers respectively. In such a manner, the roller retainers 15 with the rollers 53 can change their direction three-dimensionally freely. Hence, the roller retainers 15 can make such complex motion as that required of the changing-direction passages B of the spline in this embodiment.

As described above, according to the present invention, a roller retainer is made thin to hold opposite side surfaces of a corresponding roller and front and rear surfaces of the roller in the direction of the movement of the roller. A linear guide portion and a curve guide portion different in inclination angle from each other are formed in each end surface of the roller retainer in the direction of the movement of the roller retainer. Hence, in the curved race, the curve guide portion comes into contact with an adjacent roller retainer. In the linear race, the linear guide portion comes into contact with an adjacent roller retainer. Hence, in either of the linear race and curved race constituting a circulation race, the rear-side roller retainer can press the front-side roller retainer without spoiling the posture of the roller located in the front side in the direction of the movement of the roller. Hence, rollers can be aligned so that smooth circulation can be obtained. Further, because the roller retainer is made thin, the following effects are obtained.

(1) Adjacent roller retainers can press each other while they are allowed to rotate slightly around the axes of corresponding rollers respectively. As a result, the roller retainer can be obtained as a roller retainer adapted to a complex circulation path such as a three-dimensional changing-direction passage or a helical load rolling passage shaped like a screw.

(2) A large space can be secured for reserving lubricating oil in the circulation path. Hence, the rollers can be lubricated sufficiently.

(3) A drop-down prevention member for supporting the roller retainer can be provided in the circulation path so that the roller retainer is prevented from dropping down from the nut member, or the like.

What is claimed is:

1. A roller retainer assembly, comprising:

a plurality of roller retainers for individually correspondingly retaining a plurality of rollers circulating in a roller circulation path inclusive of linear and curved races;

wherein each of said roller retainers hold opposite side surfaces of said roller and either one of front and rear surfaces of said roller in a direction of movement of said roller;

wherein a linear guide portion and a curve guide portion which are different in inclination angle from each other are formed in one end surface of said roller retainer in a direction of movement of said roller retainer; and wherein said linear guide portion of said roller retainer comes into contact with an adjacent roller in said linear race and said curve guide portion of said roller retainer comes into contact with said adjacent roller in said curved race.

2. A roller retainer assembly according to claim 1, wherein each of said linear guide portion and said curve guide portion of said roller retainer is formed to be a curved surface in accordance with an outer circumference of said roller.

3. A roller retainer assembly according to claim 1, wherein the plurality of rollers have a cylindrical or substantially cylindrical shape.

4. A direct-acting guide device comprising:

a race shaft containing a roller rolling surface;

a slide member including a roller circulation path containing a load rolling surface corresponding to said roller rolling surface, said slide member being fitted to said race shaft so as to be freely movable relative to said race shaft;

a plurality of rollers arranged and received in said roller circulation path so as to circulate in accordance with movement of said slide member relative to said race shaft; and a plurality of roller retainers for holding said plurality of rollers individually and correspondingly so that said plurality of rollers are rotatable and/or slidable;

wherein said plurality of rollers are arranged and received so that axes of adjacent rollers are kept approximately parallel to each other;

wherein each of said roller retainers hold opposite side surfaces of corresponding one of said rollers and either one of front and rear surfaces of said roller in a direction of movement of said roller;

wherein a linear guide portion and a curve guide portion which are different in inclination angle from each other are formed in one end surface of said roller retainer in a direction of movement of said roller retainer; and wherein said linear guide portion of said roller retainer comes into contact with an adjacent roller in a linear race and said curve guide portion of said roller retainer comes into contact with said adjacent roller in a curved race.

5. A direct-acting guide device according to claim 4, wherein the plurality of rollers have a cylindrical or substantially cylindrical shape.

6. A roller screw comprising:

a race shaft containing a helical roller rolling surface;

a slide member including a roller circulation path containing a helical load rolling surface corresponding to said roller rolling surface, said slide member being fitted to said race shaft so as to be freely movable relative to said race shaft;

a plurality of rollers arranged and received in said roller circulation path so as to circulate in accordance with movement of said slide member relative to said race shaft; and a plurality of roller retainers for holding said plurality of rollers individually and correspondingly so that said plurality of rollers are rotatable and/or slidable;

wherein said plurality of rollers are arranged and received so that axes of adjacent rollers are kept approximately parallel to each other;

wherein each of said roller retainers hold opposite side surfaces of corresponding one of said rollers and either one of front and rear surfaces of said roller in a direction of movement of said roller;

wherein a linear guide portion and a curve guide portion which are different in inclination angle from each other are formed in one end surface of said roller retainer in a direction of movement of said roller retainer; and wherein said linear guide portion of said roller retainer comes into contact with an adjacent roller in a linear race and said curve guide portion of said roller retainer comes into contact with said adjacent roller in a curved race.

7. A roller screw according to claim 6, wherein the plurality of rollers have a cylindrical or substantially cylindrical shape.

* * * * *